UNITED STATES PATENT OFFICE.

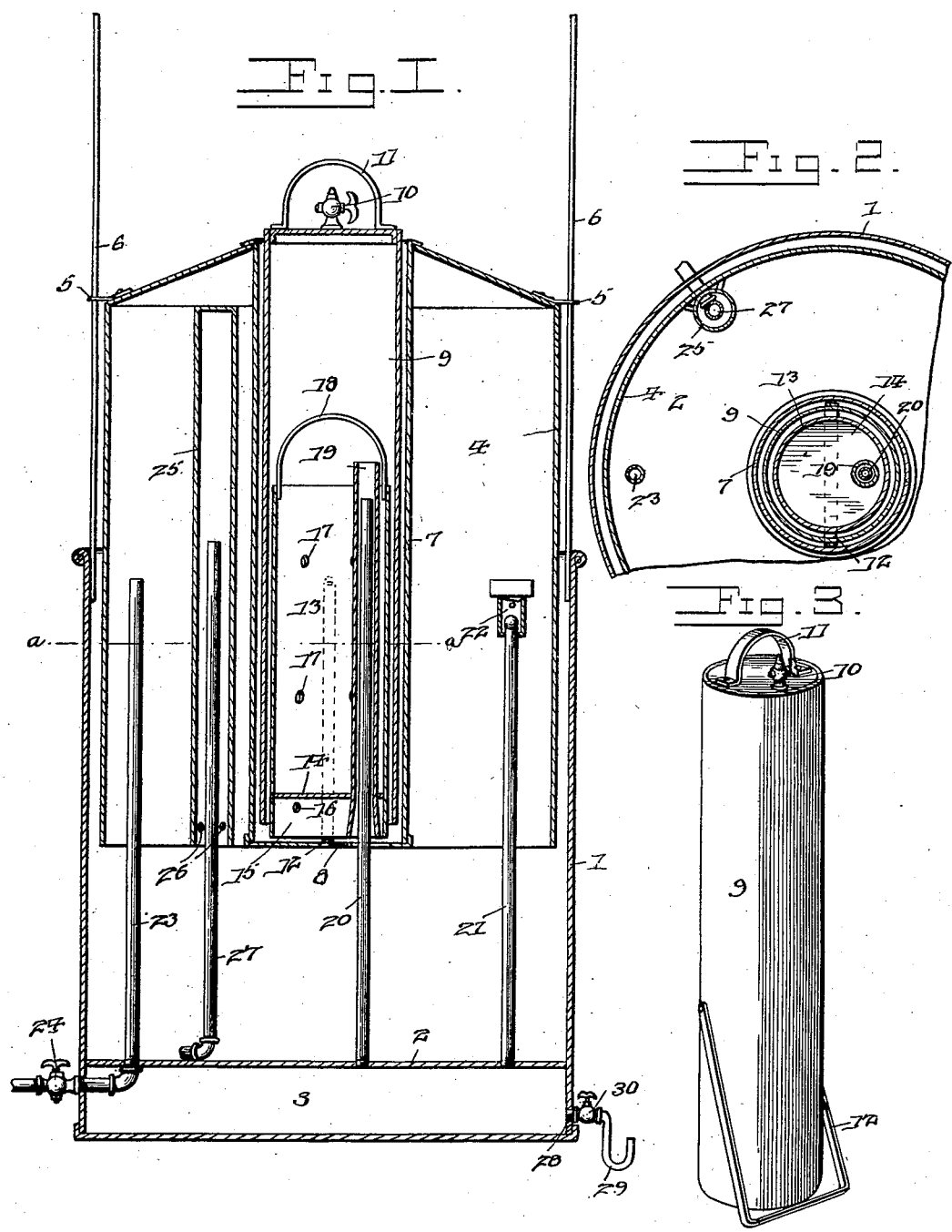

HERBERT LEE BUGG, OF WALNUTRIDGE, ARKANSAS.

ACETYLENE-GAS GENERATOR.

SPECIFICATION forming part of Letters Patent No. 705,902, dated July 29, 1902.

Application filed July 11, 1900. Serial No. 23,264. (No model.)

*To all whom it may concern:*

Be it known that I, HERBERT LEE BUGG, a citizen of the United States, residing at Walnutridge, in the county of Lawrence and State of Arkansas, have invented a new and useful Acetylene-Gas Generator, of which the following is a specification.

My invention relates to certain improvements in acetylene-gas generators; and it consists principally in improved construction of the mechanism for supporting and removing the carbid vessel from the generator, as more fully set forth hereinafter.

In the accompanying drawings, Figure 1 is a vertical central sectional view of an acetylene-gas-generating apparatus constructed in accordance with my invention. Fig. 2 is a detail sectional view of the same, taken on line *a a* of Fig. 1. Fig. 3 is a detail perspective view of the generating vessel.

The water-tank 1 is provided with a false bottom 2, whereby a compartment 3 is formed in the bottom of the water-tank. The bell 4, forming the gas-holder, is provided with laterally-extending lugs or ears 5, having openings through which extend guide-rods 6, that project vertically from the sides of the water-tank. The gas holder or bell has a chamber 7, which depends centrally from the top of the bell, the bottom of the said chamber being closed and provided with an opening 8 and the upper end of the said chamber being open. A cylindrical generating vessel 9 is placed in the chamber 7 and is of slightly less diameter than said chamber, the said generating vessel having its upper end closed and provided with a vent-cock 10 and handle 11 and the lower end of said chamber or generating vessel 9 being open, as shown. A U-shaped strap 12 of suitable material has the upper end of its vertical arms pivoted to the sides of the vessel 9, the said strap being adapted to swing under the bottom of the said vessel and support the same in a slightly-elevated position above the bottom of the chamber 7 and the said strap also serving to support the cylindrical carbid vessel 13, which is placed in the vessel 9, so that when the latter is lifted out of the chamber 7 the said carbid vessel will be lifted with said vessel 9. The swinging strap also serves as a means for readily detaching the carbid vessel from the generating vessel 9 after they are removed from the apparatus. The bottom 14 of the cylindrical carbid vessel is at some distance above the lower edge of the same, thereby forming a compartment 15 under the bottom of the carbid vessel, which compartment 15 is open on its lower side and has communicating openings 16 in the sides of the carbid vessel. The latter is provided with suitable openings 17 above the bottom thereof, and at the upper end of the carbid vessel, which is open, is a bail or handle 19, by means of which the carbid vessel may be readily handled when the same is out of the generating vessel 9. A tube 19 is disposed vertically in the carbid vessel, extends from a suitable distance above the upper end thereof downward to the bottom of the same, and the said tube 19 is adapted to slide vertically on a gas-pipe 20, which leads from the compartment 3 in the bottom of the water-tank, the upper and lower ends of said gas-pipe being open. A gas-pipe 21 also extends vertically from the bottom of the water-tank and communicates with the compartment 3, and said pipe 21 has a check-valve 22 at its upper end, which is disposed in the gas-space within the bell. A gas-service pipe 23 is provided, which communicates with the gas-space in the bell and preferably extends down through the water-space in the water-tank and may be provided with a suitable valve, as at 24. A tube 25, which is closed at its upper end and open at its lower end and provided at a suitable distance from its lower end with openings 26, is disposed vertically in and carried by the bell. A gas-discharge pipe 27 has its upper end disposed in said tube 25, and said gas-discharge pipe leads to the open air exterior of the building in which the gas-generating apparatus is installed.

In operation, the tank 1 being supplied with water, the carbid vessel being charged with carbid, and the parts being assembled as shown in Fig. 1 and hereinbefore described, the water from the tank 1 enters the lower end of the chamber 7 through the opening 8 and forms a seal between said chamber 7, the generating vessel 9, and the carbid vessel, the air below the bottom of the latter being vented through the openings 16, and as the water enters the opening 17 it attacks the carbid, thereby causing acetylene gas to be generated. As the gas increases in volume it passes from the generating chamber or vessel 9, through the pipe 20, into the chamber 3 in the bottom of the tank, from said chamber, through the pipe 21, past the check-valve 22 into the bell, and from the latter through the service-pipe. When the gas is not being used or is being generated faster than it is used, the bell rises to such an extent as to cut off the supply of water to the carbid vessel, thereby discontinuing the generation of the gas. Hence the generator is automatic in its operation and the gas is generated only as it is used. In the event of an excessive accumulation of gas in the bell the latter will rise to such an extent as to uncover the openings 26 in the pipe 25, which are normally submerged in the water in the tank, whereupon the excess of the gas will be discharged through the pipe 27, and hence danger of explosion is averted.

The excess of water in the newly-generated gas condenses in the receptacle 3, and the water of condensation may be drawn from said receptacle when necessary through a pipe 28, which is provided with a trap 29 and stop-cock 30.

Having thus described my invention, I claim—

The combination in an acetylene-gas generator, of the water-tank 1, a bell 4 having a centrally-disposed open-top cylinder 7, a perforated bottom for said cylinder, an open-bottom generating vessel 9 situated within said cylinder and having a handle 11, a U-shaped strap 12 having its ends pivotally connected to the opposite sides of the vessel and resting on the perforated bottom of the cylinder and supporting said vessel at a distance above said bottom, a carbid vessel in said generating vessel, said carbid vessel being supported on said strap and removable with the generating vessel from the apparatus, said strap serving as a means for readily detaching the carbid vessel from the generating-chamber, substantially as specified.

In testimony that I claim the foregoing as my own I have hereto affixed my signature in the presence of two witnesses.

HERBERT LEE BUGG.

Witnesses:
D. SLOAN,
C. A. RANKIN.